United States Patent
Kim (10) Patent No.: US 7,418,257 B2
(45) Date of Patent: Aug. 26, 2008

(54) MOBILE COMMUNICATION TERMINAL, WIRELESS DATA SERVICE AUTHENTICATION SERVER, SYSTEM FOR AUTOMATICALLY BLOCKING VOICE CALL CONNECTION, AND METHOD OF PROCESSING VARIOUS MESSAGES IN MOBILE COMMUNICATION TERMINAL

(75) Inventor: Myong-Ju Kim, Gunpo-Si (KR)

(73) Assignee: Pantech & Curitel Communications, Inc., Seoul (KR)

( * ) Notice: Subject to any disclaimer, the term of this patent is extended or adjusted under 35 U.S.C. 154(b) by 0 days.

(21) Appl. No.: 11/209,771

(22) Filed: Aug. 24, 2005

(65) Prior Publication Data

US 2006/0046689 A1   Mar. 2, 2006

(30) Foreign Application Priority Data

| Aug. 31, 2004 | (KR) | 10-2004-0069248 |
| Aug. 31, 2004 | (KR) | 10-2004-0069249 |
| Sep. 6, 2004 | (KR) | 10-2004-0070917 |
| Oct. 1, 2004 | (KR) | 10-2004-0078446 |
| Oct. 1, 2004 | (KR) | 10-2004-0078448 |

(51) Int. Cl.
*H04M 1/66* (2006.01)

(52) U.S. Cl. ........ 455/411; 455/405; 455/406; 455/410

(58) Field of Classification Search ........ 455/406, 455/408, 411, 410
See application file for complete search history.

(56) References Cited

U.S. PATENT DOCUMENTS

| 5,822,691 | A | * | 10/1998 | Hosseini | 455/410 |
| 6,038,440 | A | * | 3/2000 | Wu | 455/410 |
| 6,236,852 | B1 | * | 5/2001 | Veerasamy et al. | 455/411 |
| 2001/0055982 | A1 | * | 12/2001 | Umeda | 455/560 |
| 2002/0102962 | A1 | * | 8/2002 | Grinn et al. | 455/406 |
| 2003/0045271 | A1 | * | 3/2003 | Carey et al. | 455/411 |
| 2005/0148321 | A1 | * | 7/2005 | Igarashi et al. | 455/411 |
| 2006/0052083 | A1 | * | 3/2006 | Choi et al. | 455/406 |
| 2006/0111126 | A1 | * | 5/2006 | Chithambaram | 455/456.5 |

FOREIGN PATENT DOCUMENTS

| JP | 2000-83017 | 3/2000 |
| KR | 2000-0038661 | 7/2000 |
| KR | 2004-0050578 | 6/2004 |
| KR | 2004-0072210 | 8/2004 |
| WO | WO 99/49688 | 9/1999 |

* cited by examiner

*Primary Examiner*—Rafael Pérez-Gutiérrez
*Assistant Examiner*—Amancio González
(74) *Attorney, Agent, or Firm*—Oblon, Spivak, McClelland, Maier & Neustadt, P.C.

(57) ABSTRACT

Disclosed is a technology for preventing a legitimate terminal's user from being damaged due to the fraudulent usage of a cloned terminal. A mobile communication terminal transmits authentication information containing terminal usage time information to a wireless network according to a voice call connection procedure, and performs a voice call release process upon receiving an authentication failure message from the wireless network in response to the authentication information.

8 Claims, 8 Drawing Sheets

FIG.8

MOBILE COMMUNICATION TERMINAL, WIRELESS DATA SERVICE AUTHENTICATION SERVER, SYSTEM FOR AUTOMATICALLY BLOCKING VOICE CALL CONNECTION, AND METHOD OF PROCESSING VARIOUS MESSAGES IN MOBILE COMMUNICATION TERMINAL

BACKGROUND OF THE INVENTION

This application claims the priorities of Korean Patent Application Nos. 2004-69248 and 2004-69249, filed on Aug. 31, 2004, No. 2004-70917, filed on Sep. 6, 2004, Nos. 2004-78446 and 2004-78448, filed on Oct. 1, 2004, in the Korean Intellectual Property Office, the disclosures of which are incorporated herein in their entireties by reference.

1. Field of the Invention

The present invention relates to a mobile communication technology and, more particularly, to a technology for preventing a legitimate mobile terminal's user from being damaged due to the fraudulent usage of a cloned mobile terminal.

2. Description of the Related Art

Recently, with the development of mobile communication technologies and the improvement of the performance and function of mobile communication system, mobile communication terminals have been able to receive wireless application protocol (WAP) or Web service over the Internet. That is, the mobile communication terminals can download, store and reproduce multimedia content, such as color pictures, animation, moving images, music, text, and games, as well as voice or text data. At present, mobile carriers offer multimedia content services by constructing communication modules to support communication protocols for Internet connections between mobile communication terminals and WAP or Web servers and networks to support high-speed and large-capacity packet switching systems.

Figure 1:
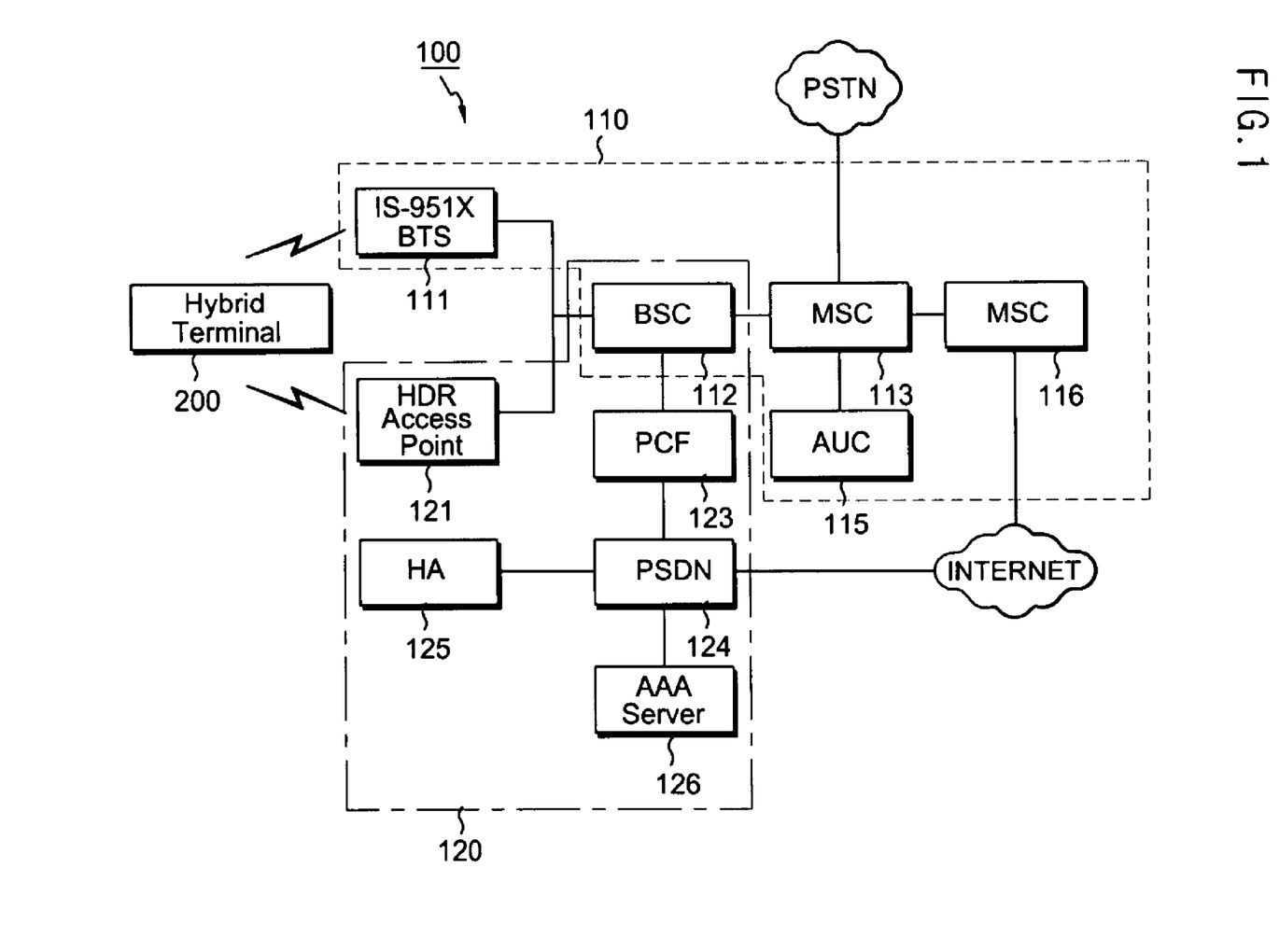
FIG. 1 is a block diagram showing the configuration of a conventional call connection service system.

FIG. 1 shows the configuration of a conventional call connection service system. A call connection service system 100 comprises an interim standard 95 (IS-95)/code division multiple access 2000 (CDMA2000) 1x wireless network 110 for processing voice and text messages, and a high data rate (HDR) wireless network 120 for processing high-volume data packets at a high data rate. A hybrid terminal 200 is a mobile communication terminal designed to allow a user to use voice and high-speed data communication services by combining IS-95 or CDMA2000 1x and CDMA2000 1xEV-DO (Evolution-Data Optimized).

The IS-95/1x wireless network 110 includes an IS-95/1x base transceiver station (BTS) 111 for transforming signal formats to be suitable for wireless and wireline links for a base station which establishes a radio path with the hybrid terminal 200 in an IS-95/1x manner; a base station controller (BSC) 112 for collecting and managing information on the operation of the BTS 111; a mobile switching center (MSC) 113, connected to the BSC 112 and a network such as public switched telephone network (PSTN) or Internet, for offering a circuit switching service to a mobile communication subscriber; an authentication center (AuC) 115 for storing a mobile identification number (MIN) and an electronic serial number (ESN) as subscriber authentication information, determining whether or not a corresponding terminal has been registered on the basis of the subscriber authentication information, and performing an authentication process of the corresponding terminal according to the determined result; and an interworking function (IWF) 116 for connecting the mobile communication network to the Internet.

The HDR wireless network 120 includes an HDR access point 121 serving as an access point for establishing a direct radio path with the hybrid terminal 200 to perform high-speed data communication and controlling operations of transmitting/receiving data to/from the hybrid terminal 200; a packet control function (PCF) 123 for exchanging data packet information between the HDR access point 121 and a packet data serving node (PDSN) 124; the PSDN 124, connected to the BSC 112 through the PCF unit 123, for controlling the overall high-speed data communication between the mobile communication network and the Internet; a home agent (HA) 125, connected to the PSDN 124, for performing mobile Internet Protocol (IP) authentication for a packet service; and a wireless data service authentication, authorization, and accounting (AAA) server 126 for verifying that a user is a valid subscriber, determining what services are available for the user, and tracking usage for billing.

A predefined authentication algorithm and a unique authentication value are given to the AuC 115 and a mobile communication terminal 200. The authentication value includes a random number (RAND) received from the MSC, an authentication key, a terminal ESN, a subscriber MIN, and shared secret data (SSD). The mobile communication terminal 200 generates authentication request data using the above-mentioned authentication value and authentication algorithm, and transmits the authentication request data and call history count data to the MSC 113.

The AuC 115 performs an authentication operation upon receiving the authentication request data, the call history count data, and RAND data from the MSC 113. In more detail, the AuC 115 enters an authentication key, a terminal ESN, a subscriber MIN, and SSD, which are stored therein, and RAND received from the MSC 113 into an authentication algorithm, generates authentication response data, and compares the authentication response data with the authentication request data received from the MSC 113. In addition, the AuC 115 compares call history count data of a corresponding terminal, which is stored therein, with call history count data received from the MSC 113. When the stored call history count data of the corresponding terminal is identical to the call history count data received from the MSC 113, the AuC 115 determines the corresponding terminal to be a legitimate mobile communication terminal and permits a voice call to be established. Otherwise, if the stored call history count data of the corresponding terminal is different from the call history count data received from the MSC 113, the AuC 115 determines the corresponding terminal to be a cloned terminal, transmits a lock order message indicating authentication failure to the corresponding terminal through the BTS and blocks a voice call connection of the corresponding terminal.

However, as mobile communication terminals have come into wide use, there is increasing the number of cloned terminals in which a legitimate terminal's authentication key, subscriber MIN, terminal ESN, and call history count data are cloned by a fraudulent user. Accordingly, a user using the legitimate terminal may be excessively charged for the fraudulent usage of the cloned terminal.

In addition, since the lock order message received over a wireless network is transmitted to both legitimate and cloned terminals, a call connection to the legitimate terminal, as well as the cloned terminal, currently conducting an authentication process with the wireless network or having already been authenticated is discontinued.

Figure 2:
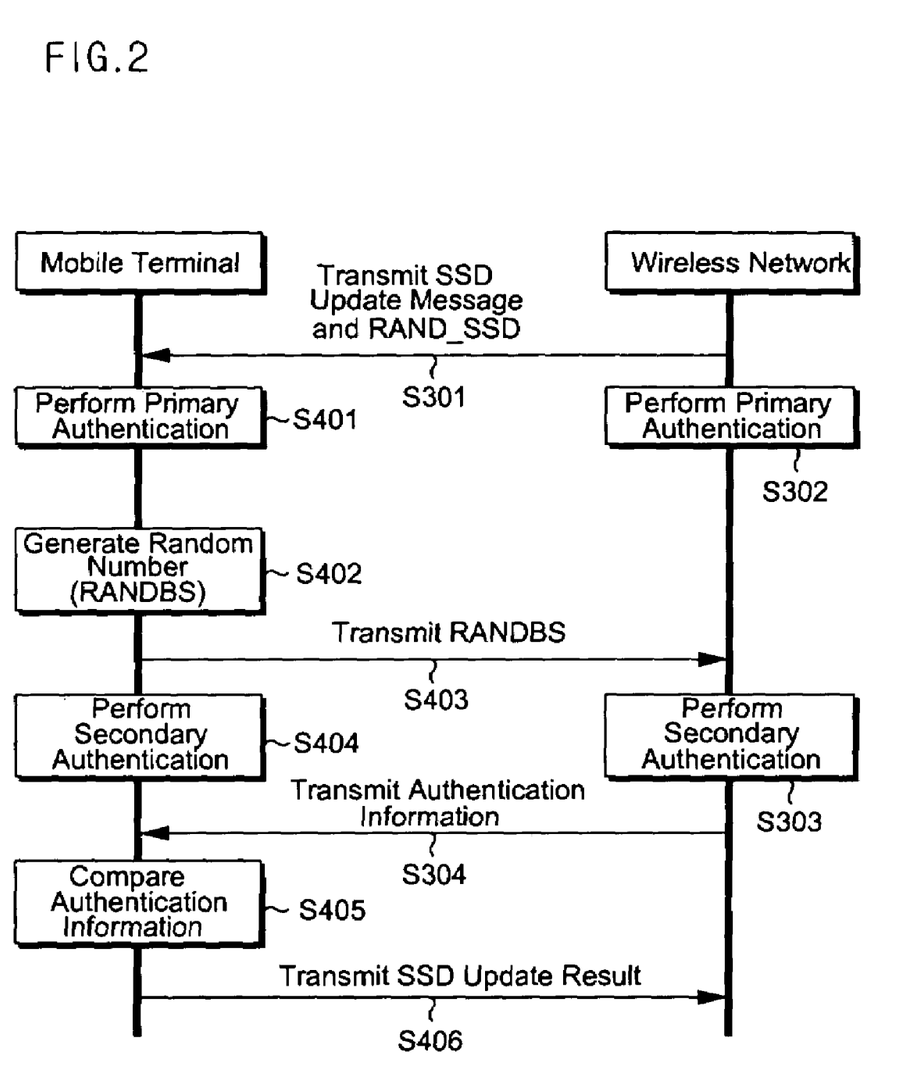
FIG. 2 is a flow chart showing an SSD update process used in a conventional call connection service system.

In order to solve the above-mentioned problems, a conventional system and terminal has been configured to update SSD. FIG. 2 is a flow chart showing a process of updating the SSD in a conventional call connection service system. Here, the wireless network includes a BTS, a BSC, an MSC, and an AuC.

The SSD update process is initiated by transmitting an SSD update message and a random number (RAND_SSD) from the wireless network to the terminal (step S301). The terminal initializes stored SSD, performs a primary authentication process using the initialized SSD, the RAND_SSD, an authentication key, a terminal ESN, a subscriber MIN, and an authentication algorithm, and generates new SSD (SSD_A_NEW) (step S401). The terminal generates a random number (RANDBS) using a random number generation function stored therein (step S402), and transmits the generated random number (RANDBS) to the wireless network (step S403). The terminal performs a secondary authentication process using the generated random number (RANDBS), SSD (SSD_A_NEW), an authentication key, a terminal ESN, a subscriber MIN, and an authentication algorithm, and generates new authentication information (step S404).

The wireless network transmits the SSD update message and the random number (RAND_SSD) to the terminal, initializes the stored SSD of a corresponding terminal, performs a primary authentication process using the initialized SSD, the transmitted random number (RAND_SSD), an authentication key, a terminal ESN, a subscriber MIN, and an authentication algorithm, and generates new SSD (SSD_A_NEW) (step S302). The wireless network performs a secondary authentication process using the random number (RANDBS), the SSD (SSD_A_NEW), the authentication key, the terminal ESN, the subscriber MIN, and the authentication algorithm, which are transmitted from the terminal, and generates new authentication information (step S303). In this case, since the wireless network and the terminal use the same authentication algorithm, the new SSD (SSD_A_NEW) and the authentication information generated in the wireless network are identical to those generated in the terminal. The wireless network transmits the generated authentication information to the terminal (step S304).

The terminal compares the authentication information received from the wireless network with the authentication information generated in step 404 (step 405). If the authentication information received from the wireless network is identical to the authentication information generated in step S404, the terminal transmits SSD update success information to the wireless network (step S406).

However, the conventional call connection service system has a disadvantage in that a fraudulent user using the cloned terminal, in which a legitimate terminal's authentication key, subscriber MIN, and terminal ESN are cloned, may acquire a new SSD by performing an SSD update process with the wireless network.

In the meantime, the conventional data call service system cannot detect whether or not the cloned terminal having the cloned subscriber MIN and terminal MSN attempts to make a wireless data call and thus unable to prevent the cloned terminal from making a wireless data call.

SUMMARY OF THE INVENTION

The present invention provides a technology for blocking a cloned mobile communication terminal from making a voice call and accessing a wireless data service.

The present invention also provides a technology for allowing a legitimate terminal to ignore a lock order message received from a wireless network, and preventing a call connection of a cloned terminal according to the lock order message.

The present invention also provides a technology for allowing a legitimate terminal to perform an SSD update process and preventing a cloned terminal from performing the SSD update process in case of receiving an SSD update message from a wireless network.

In accordance with an aspect of the present invention, there is provided a mobile communication terminal for transmitting authentication information containing terminal usage time information to a wireless network according to a voice call connection procedure, and performing a voice call release process upon receiving an authentication failure message from the wireless network in response to the authentication information.

The mobile communication terminal may comprise: a memory unit for storing program data and program-associated data; a RF communication unit for transmitting/receiving voice and data signals to/from the wireless network via an antenna; and a control unit including an authentication processor for transmitting authentication information containing terminal usage time information stored in the memory unit to the wireless network via the RF communication unit according to a voice call connection procedure, and performing a voice call release process upon receiving an authentication failure message from the wireless network in response to the authentication information.

In accordance with another aspect of the present invention, there is provided a system for automatically blocking a voice call connection, comprising: a wireless network for receiving a voice call initiation message including the authentication information containing the terminal usage time information from a mobile communication terminal, generating and transmitting a voice call connection request message including authentication information containing terminal usage time information to an MSC; and an MSC for receiving the voice call connection request message including the authentication information containing the terminal usage time information from the wireless network, comparing the received terminal usage time information with previously stored terminal usage time information of a corresponding mobile communication terminal, and transmitting an authentication success message or an authentication failure message (i.e., a lock order message) to the mobile communication terminal over the wireless network.

The terminal usage time information may be monthly outgoing-call origination usage time information.

In accordance with another aspect of the present invention, there is provided a mobile communication terminal for transmitting authentication information comprised of a subscriber MIN, a terminal ESN, and data usage amount information to a wireless data service authentication server over a wireless network according to a wireless data service connection procedure, and performing a wireless data connection release process upon receiving an authentication failure message from the wireless data service authentication server in response to the authentication information.

The mobile communication terminal may comprise: a key input unit for allowing a user to input an operation command; a memory unit for storing the subscriber MIN, the terminal ESN, and the data usage amount; a RF communication unit for transmitting/receiving voice and data signals to/from the wireless network; and a control unit including an authentication processor for transmitting the subscriber MIN, the terminal ESN, and the data usage amount information stored in the memory unit to the wireless data service authentication server via the RF communication unit upon receiving a wireless data service connection request command from the key input unit, and performing a wireless data connection release process upon receiving an authentication failure message from the wireless data service authentication server in response to the transmitted information.

In accordance with another aspect of the present invention, there is provided a wireless data service authentication server comprising: a memory unit for storing information about subscriber MIN, terminal ESN, and data usage amount of a mobile communication terminal registered for a mobile communication service; and a control unit for receiving authentication information comprised of the subscriber MIN, the terminal ESN, and the data usage amount information of a mobile communication terminal requesting a wireless data service connection over a wireless network, comparing the received authentication information with the mobile communication terminal's data usage amount information stored in the memory unit, and transmitting an authentication success message or an authentication failure message to the mobile communication terminal over the wireless network.

The data usage amount information may be total data usage amount information or originating data usage amount information.

In accordance with another aspect of the present invention, there is provided a call processing method used in a mobile communication terminal, wherein upon receipt of a voice call connection request command, an authentication state is checked and a voice call connection process is performed if the authentication state is determined to authentication success.

The method may comprise the steps of: receiving a voice call connection request command; checking an authentication flag; and performing a voice call connection process if the authentication flag is determined to be a first value indicating authentication success.

The method may further comprise performing a voice call connection release process if the authentication flag is determined to be a second value.

The method may further comprise setting the authentication flag to the second value upon receiving an authentication failure message from a wireless network, and performing a voice call connection release process.

In accordance with another aspect of the present invention, there is provided a mobile communication terminal for checking an authentication state upon receipt of a voice call connection request command and performing a voice call connection process if the authentication state is determined to authentication success.

The mobile communication terminal may comprise: a key input unit for allowing a user to input an operation command; a memory unit for storing an authentication flag; a RF communication unit for communicating with a wireless network over a control or voice channel; and a control unit including an authentication processor for receiving a voice call connection request command from the key input unit, checking the authentication flag stored in the memory unit, and performing a voice call connection process over the voice channel of the RF communication unit if the authentication flag indicates a first value corresponding to authentication success or performing a voice call connection release process over the voice channel of the RF communication unit if the authentication flag indicates a second value corresponding to authentication failure.

The authentication processor may set the authentication flag to a second value upon receiving an authentication failure message from the wireless network, and perform a voice call connection release process.

In accordance with another aspect of the present invention, there is provided a mobile communication terminal for receiving an authentication failure message containing terminal usage information acting as grounds for authentication failure from a wireless network due to the fraudulent usage of a cloned mobile communication terminal having requested a call connection in advance during an authentication operation for a call connection with the wireless network or an idle state, comparing the received terminal usage information with corresponding terminal usage information stored in the mobile communication terminal, and ignoring the authentication failure message if both of the terminal usage information are identical to each other as a result of the comparison, or setting an authentication flag to be authentication failure if both are not identical.

The mobile communication terminal may comprise: a RF communication unit for transmitting/receiving voice and data signals to/from a wireless network; a memory unit for storing terminal usage information and terminal state information containing an authentication flag; an authentication processor for receiving an authentication failure message and terminal usage information acting as grounds for authentication failure from the wireless network via the RF communication unit, comparing the received terminal usage information with corresponding terminal usage information stored in the memory unit, and ignoring the authentication failure message if both of the terminal usage information are identical to each other as a result of the comparison, or setting an authentication flag to be an authentication failure if both are not identical; and a terminal usage management unit for updating the terminal usage information stored in the memory unit upon receiving an authentication success message from the authentication processor.

In accordance with another aspect of the present invention, there is provided a method of processing an authentication failure message transmitted from a wireless network due to the fraudulent usage of a cloned mobile communication terminal having requested a call connection in advance in a mobile communication terminal currently conducting an authentication operation for a call connection with the wireless network, the method comprising the steps of: requesting a call connection from the wireless network and receiving a random number (RAND) from the wireless network in response to the call connection request; generating authentication information using the received random number, an authentication generation factor stored in a memory unit, and an authentication algorithm; transmitting the generated authentication information and terminal usage information stored in the memory unit to the wireless network; checking an authentication result received from the wireless network; setting an authentication flag to a first value indicating authentication success in case of authentication success, or comparing terminal usage information acting as grounds for authentication failure transmitted from the wireless network with corresponding terminal usage information stored in the memory unit in case of authentication failure; and retransmitting the generated authentication information and the terminal usage information stored in the memory unit to the wireless network if both of the terminal usage information are identical to each other as a result of the comparison, or setting the authentication flag to a second value indicating authentication failure if both are not identical.

In accordance with another aspect of the present invention, there is provided a method of processing an authentication failure message transmitted from a wireless network due to the fraudulent usage of a cloned mobile communication terminal having requested a call connection in advance in a mobile communication terminal in an idle state, the method comprising the steps of: receiving an authentication failure message and terminal usage information acting as grounds for authentication failure from the wireless network; comparing the received terminal usage information with corresponding terminal usage information stored in the memory unit; and ignoring the authentication failure message if both of the terminal usage information are identical to each other as a result of the comparison, or setting an authentication flag to authentication failure if both are not identical.

The terminal usage information may be call history count information, monthly usage time information, or data usage amount information.

In accordance with another aspect of the present invention, there is provided a mobile communication terminal for receiving an SSD update message including terminal usage information from a wireless network, comparing the received terminal usage information with corresponding terminal usage information stored in the terminal, and performing an SSD update process if both of the terminal usage information are identical to each other as a result of the comparison, or transmitting an SSD update failure message to the wireless network if both are not identical.

The mobile communication terminal may comprise: a key input unit for allowing a user to input an operation command; a RF communication unit for transmitting/receiving voice and data signals to/from a wireless network; a memory unit for storing the terminal usage information and terminal state information containing an authentication flag; an SSD update processor for receiving an SSD update message and terminal usage information from the wireless network via the RF communication unit, comparing the received terminal usage information with corresponding terminal usage information stored in the memory unit, and performing an SSD update process if both of the terminal usage information are identical to each other as a result of the comparison, or transmitting an SSD failure message to the wireless network if both are not identical; and a terminal usage management unit for updating the terminal usage information stored in the memory unit upon receiving an authentication success message from the wireless network via the RF communication unit.

In accordance with another aspect of the present invention, there is provided a method of updating SSD in a mobile communication terminal, the method comprising the steps of: receiving an SSD update message and terminal usage information from a wireless network; comparing the received terminal usage information with corresponding terminal usage information stored in the terminal; and performing an SSD update process if both of the terminal usage information are identical to each other as a result of the comparison, or transmitting an SSD update failure message to the wireless network if both are not identical.

The terminal usage information may be call history count information or monthly usage time information.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Preferred embodiments of the present invention will be described in detail with reference to the annexed drawings. In the drawings, the same or similar elements are denoted by the same reference numerals even though they are depicted in different drawings.

Figure 3:
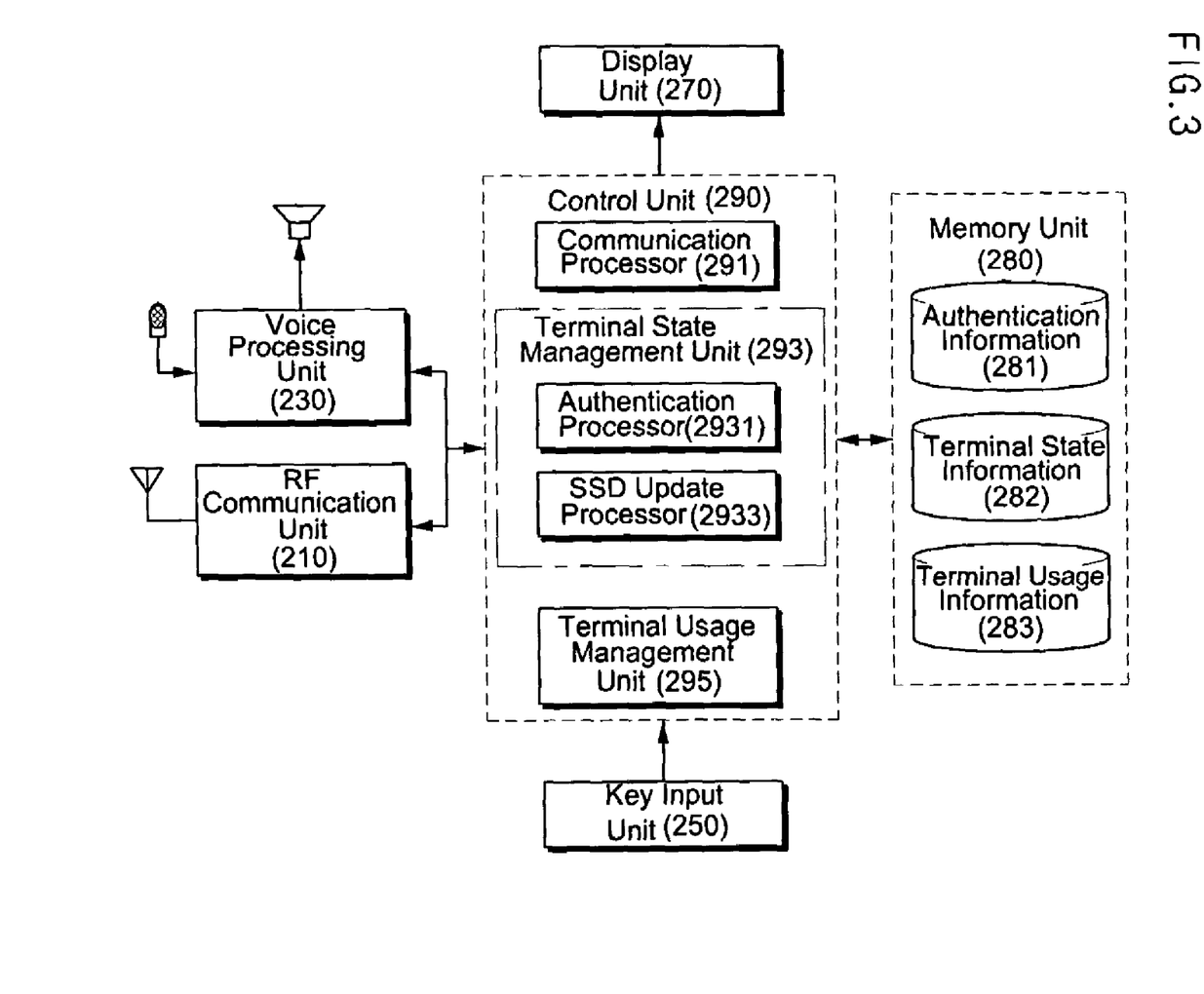
FIG. 3 is a block diagram showing the configuration of a mobile communication terminal in accordance with a preferred embodiment of the present invention.

FIG. 3 is a block diagram showing the configuration of a mobile communication terminal in accordance with a preferred embodiment of the present invention.

The mobile communication terminal includes a radio frequency (RF) communication unit 210 for extracting voice and data signals from radio signals transmitted/received via an antenna; a voice processing unit 230 for receiving a voice signal from the RF communication unit 210 and inputting/outputting the received voice signal through a microphone/speaker; and other circuits, such as a key input unit 250, a display unit 270 for displaying menu and operation information, a memory unit 280 for storing a main program and temporary data, and a control unit 290.

The memory unit 280 may be implemented with a single chip including a static random access memory (SRAM) having a storage capacity of several megabits and a flash memory having a storage capacity of tens of megabits. The memory unit 280 may store authentication information 281 including an authentication algorithm, an authentication key, a terminal ESN, a subscriber MIN, and an SSD, terminal state information 282, and terminal usage information 283.

In this case, the terminal state information 282 indicates a current operation state of a terminal. For example, the terminal state information 282 includes a schedule setup flag, a morning-call setup flag, an alarm setup flag, etc. The terminal usage information 283 indicates how many call or data services the terminal has used over a wireless network. In accordance with an embodiment of the present invention, the terminal usage information 283 preferably indicates information about call history count, terminal usage time, and packet data usage amount.

The display unit 270 displays an internal operation condition of a terminal, a menu selection display, etc. For example, a liquid crystal display (LCD) may be used as the display unit 270. The key input unit 250 acts as a device for entering a user command, and may be implemented with a keypad including function keys and numeral keys, a side key, a touch-panel, a handwriting entry unit, a voice recognition unit, etc.

The voice processing unit 230 converts digital voice data into an analog voice signal or vice versa, and includes additional circuits such as an audio amplifier or filter as well known in the art.

The RF communication unit 210 includes an antenna and an RF circuit for communicating with a base station. In the present invention, the RF communication unit 210 is configured to be available in all types of mobile communication schemes, such as TDMA, CDMA, PDC, and GSM, including mobile communication schemes to be developed later.

A baseband circuit in the RF communication unit 210 and most circuits in the control unit 290 are integrated into a commercially available single chip. This IC chip, typically called a mobile station modem (MSM) chip, includes dedicated hardware for communication, a digital signal processor, and a general-purpose microprocessor. Logically, the control unit 290 includes a communication processor 291 for controlling voice and data communications, a terminal state management unit 293, and a terminal usage management unit 295.

The terminal state management unit 293 sets a corresponding operation mode, such as schedule, morning-call, and alarm, according to an operation command of a user or an input signal received from a wireless network. Preferably, the terminal state management unit 293 includes an authentication processor 2931 and an SSD update processor 2933.

In an embodiment, upon receiving a voice call connection request message from the key input unit 250, the authentication processor 2931 generates authentication request data using authentication information stored in the memory unit 280, transmits the generated authentication request data, call history count data, and terminal usage time information to the wireless network via the RF communication unit 210, and performs a voice call connection/release process according to an authentication result from the wireless network.

In another embodiment, upon receiving a lock order message (i.e., an authentication failure message) and terminal usage information acting as grounds for authentication failure from the wireless network via the RF communication unit 210, the authentication processor 2931 compares the received terminal usage information with corresponding terminal usage information stored in the memory unit 280. If the received terminal usage information is identical to the corresponding terminal usage information stored in the memory unit 280, the authentication processor 2931 disregards the lock order message. Otherwise, if the received terminal usage information is different from the corresponding terminal usage information stored in the memory unit 280, the authentication processor 2931 sets the authentication flag to authentication failure.

In another embodiment, upon receiving a wireless data service connection request message from the key input unit 250, the authentication processor 2931 transmits a subscriber MIN, a terminal ESN, and packet data usage amount, which are stored in the memory unit 280, to a wireless data service authentication server through the RF communication unit 210. Next, upon receiving an authentication success message from the wireless data service authentication server, the authentication processor 2931 sets an authentication flag to a first value indicating authentication success. Upon receiving a lock order message from the wireless data service authentication server, the authentication processor 2931 sets an authentication flag to a second value indicating authentication failure.

According to the present invention, the wireless data authentication server may include: a memory unit for storing information about subscriber MIN, terminal ESN, and packet data usage amount of a mobile communication terminal registered for a mobile communication service; and a control unit for comparing information including a subscriber MIN, a terminal ESN, and packet data usage amount of a mobile communication terminal requesting a wireless data service connection over the wireless network with corresponding information of a corresponding mobile communication terminal stored in the memory unit, and outputting an authentication success message or an authentication failure message to the mobile communication terminal over the wireless network.

In an embodiment, the packet data usage amount may indicate a total data usage amount or an originating data usage amount. The wireless data authentication server according to the present invention may be implemented with a wireless data service AAA server for verifying that a user is a valid subscriber, determining what services are available for the user, and tracking usage for billing.

Upon receiving an SSD update message and terminal usage information from the wireless network through the RF communication unit 210, the SSD update processor 2933 compares the received terminal usage information with corresponding terminal usage information stored in the terminal. If the received terminal usage information is identical to the corresponding terminal usage information stored in the terminal, the SSD update processor 2933 performs an SSD update process. Otherwise, if the received terminal usage information is different from the corresponding terminal usage information stored in the terminal, the SSD update processor 2933 transmits an SSD update failure message to the wireless network.

Upon receiving an authentication success message from the wireless network through the RF communication unit 210 in the case of using a voice call or wireless data service, the terminal usage management unit 295 updates the terminal usage information stored in the memory unit 280. In an embodiment, the terminal usage information 283 preferably indicates call history count information, terminal usage time information, or packet data usage amount information.

Figure 4:
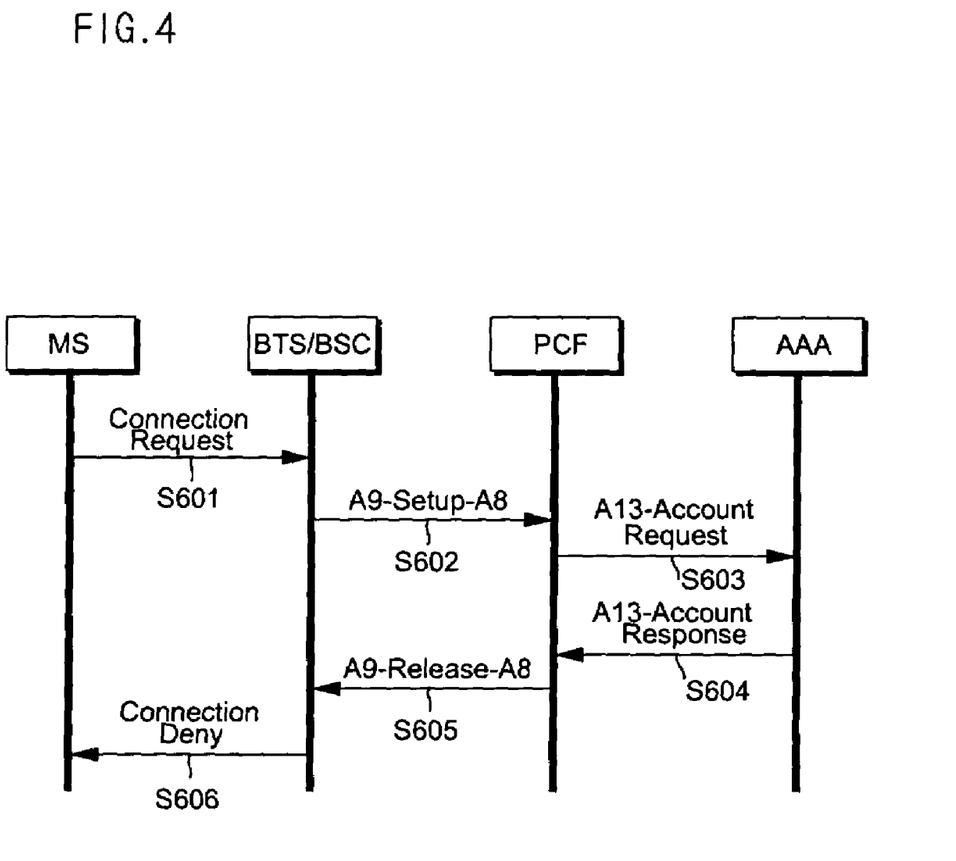
FIG. 4 is a flow chart showing a data service process used in a wireless data service system in accordance with a preferred embodiment of the present invention.

FIG. 4 is a flow chart showing a data service process used in a wireless data service system in accordance with a preferred embodiment of the present invention.

A wireless data service connection process is initiated by transmitting a service connection request message from a mobile station to a BTS (step S601). The service connection request message includes authentication information comprised of a subscriber MIN, a terminal ESN, and data usage amount. A BSC transmits the subscriber MIN and the terminal ESN to the wireless data authentication server (i.e., AAA server) through a PCF. In this case, the wireless data authentication server performs a typical authentication process using the subscriber MIN and the terminal ESN, and transmits an authentication result to the BSC. Upon confirmation of authentication success, the BSC transmits a resource allocation message (A9-Setup-A8) requesting allocation of wireless resources to the PCF (step S602).

Next, the PCF transmits an accounting request message to the wireless data authentication server (step S603). In this case, the accounting request message (A13-Accounting Request Message) may include data usage amount information of a mobile terminal requesting a wireless data service. At this time, the wireless data authentication server compares the data usage amount information received from the mobile terminal requesting an access to the wireless data service with the data usage amount information stored in the memory unit. If the data usage amount information received from the mobile terminal is different from the data usage amount information stored in the memory unit, the wireless data authentication server transmits the accounting request response message (A13-Accouting Response Message) containing a lock order message to the PCF (step S604).

Next, the PCF transmits a wireless resource release (A9-Release-A8) message containing a lock order message to the BSC (step S605). The BSC transmits a data call connection deny message (Call Deny) to the mobile terminal requesting the wireless data service through the BTS (step S606).

If the data call connection deny message (Call Deny) is transmitted through the BTS, the mobile terminal performs a wireless data connection release process to block an access to the wireless data service.

Figure 5:
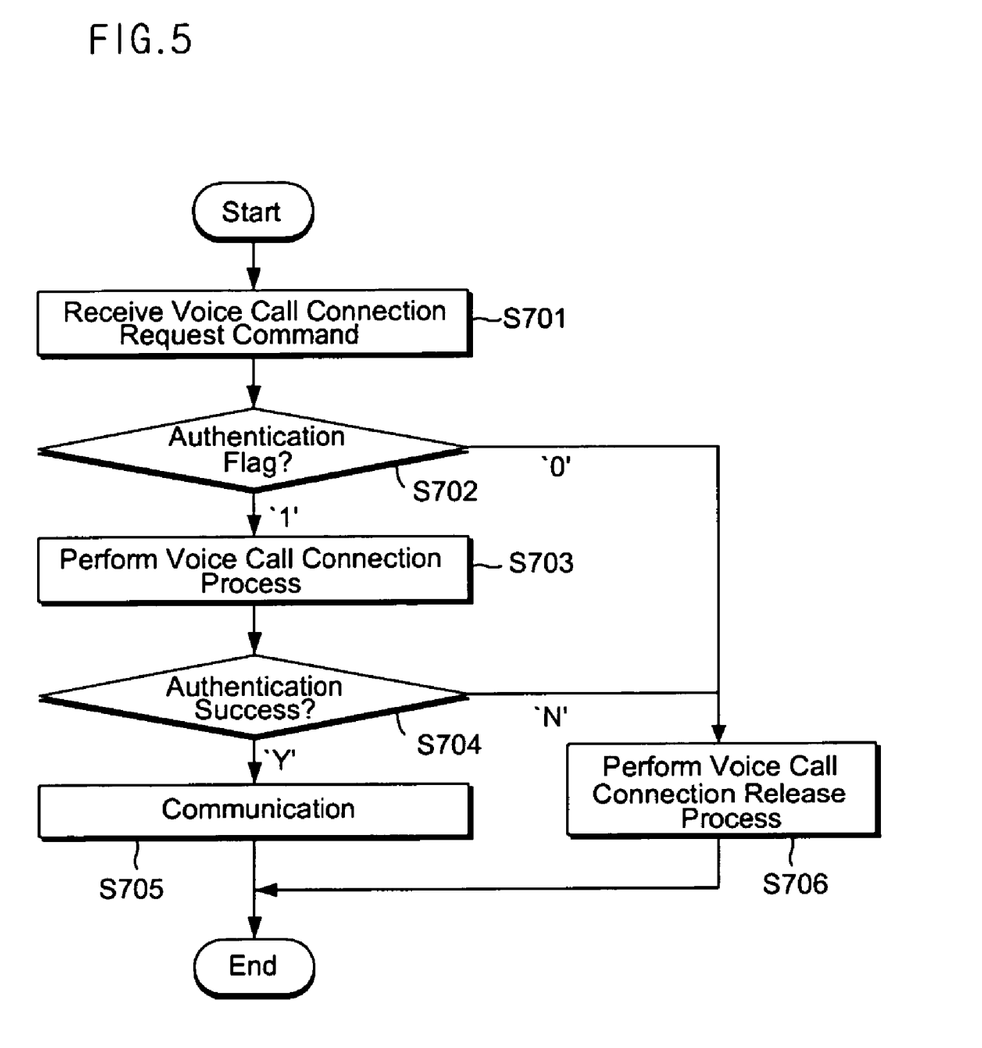
FIG. 5 is a flow chart showing a method of processing a voice call connection in accordance with a preferred embodiment of the present invention.

FIG. 5 is a flow chart showing a method of processing a voice call connection in accordance with a preferred embodiment of the present invention.

A method of processing a mobile terminal call may be initiated by receiving a voice call connection request command from a mobile terminal user (step S701). The call process method of the mobile terminal checks an authentication flag (step S702). Here, the authentication flag is one of flags indicating states of the mobile terminal.

If the authentication flag is determined to be a second value (e.g., false ('0')) indicating authentication failure, the mobile terminal call process method performs a voice call connection release process (step S706) and terminates a voice call connection. Otherwise, if the authentication flag is determined to be a first value (e.g., true ('1')) indicating authentication success, the mobile terminal call process method performs a voice call connection process (step S703). In this case, the voice call connection process includes a typical authentication process well known in the art. That is, the authentication process generates authentication request data, and transmits the generated authentication request data and the call history count data to the wireless network via the RF communication unit 210. The wireless network includes a BTS, a BSC, an MSC, and an AuC.

Next, authentication success or failure is determined from an authentication result sent from the wireless network (step S704). In case of authentication failure, an authentication flag is set to a second value, performs a voice call connection release process (step S706), and terminates a voice call connection. In case of authentication success, a call is connected to a called party through a typical procedure (step S705), and terminates a voice call connection upon receiving a communication termination signal from a mobile terminal user.

Figure 6:
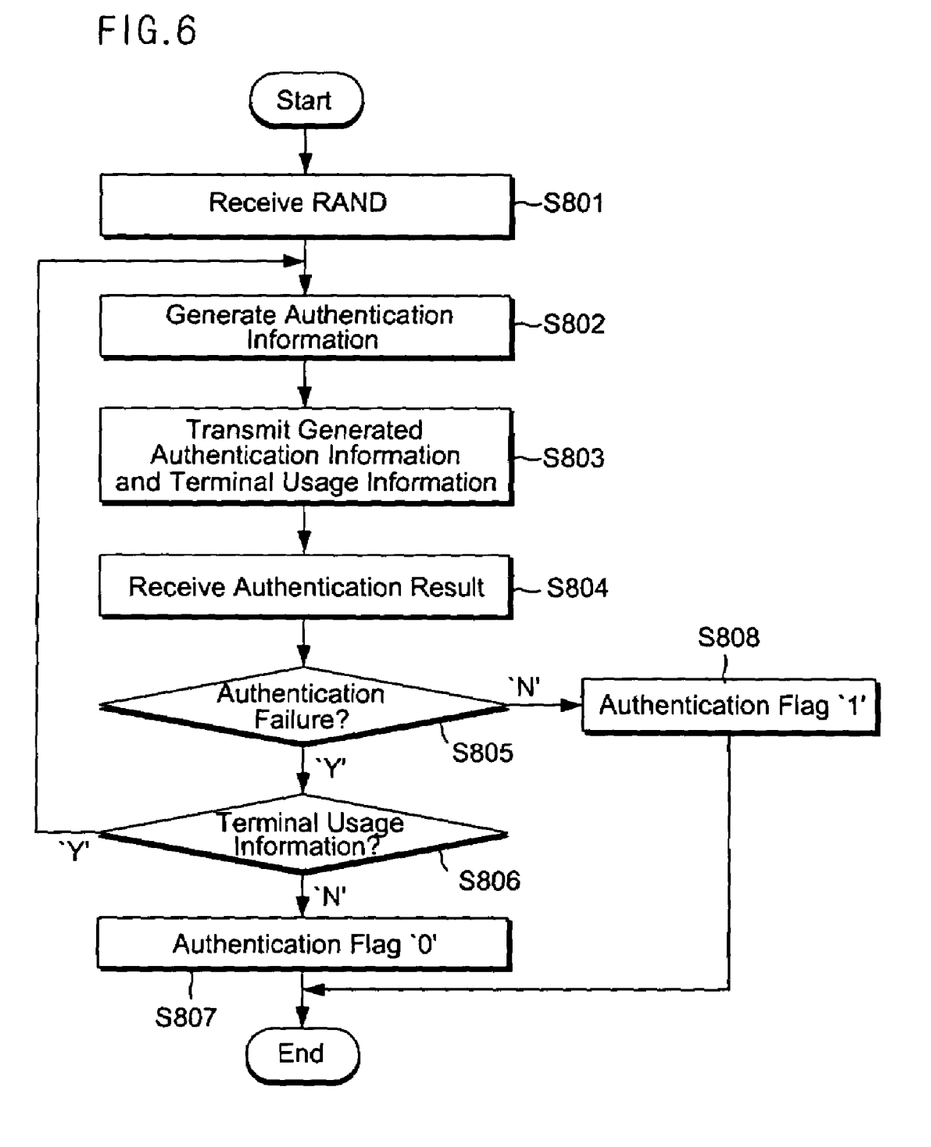
FIG. 6 is a flow chart showing a method of processing a lock order message of a mobile communication terminal in accordance with a preferred embodiment of the present invention.

FIG. 6 is a flow chart showing a method of processing a lock order message of a mobile terminal in accordance with a preferred embodiment of the present invention. That is, the present embodiment shows a procedure of processing a lock order message received from the wireless network due to the fraudulent usage of a cloned mobile terminal having requested a call connection in advance while a legitimate mobile terminal is currently conducting an authentication process with the wireless network for a call connection.

The mobile terminal requests a call connection from the wireless network according to a typical call connection protocol. At this time, an MSC in the wireless network transmits a random number (RAND) to the mobile terminal.

Upon receiving the random number (RAND) from the wireless network (step S801), the mobile terminal generates authentication information using the received random number (RAND) and authentication generation factors, such as an authentication key, a terminal ESN, a subscriber MIN, and an authentication algorithm, stored in the memory unit (step S802). The mobile terminal transmits the generated authentication information and the terminal usage information stored in the memory unit to the wireless network (step S803).

In an embodiment, the terminal usage information may indicate call history count information, terminal usage time information, and packet data usage amount information.

In the meantime, upon receiving terminal authentication information, terminal usage information, and random number (RAND) data from the MSC, the authentication server in the wireless network performs a well-known authentication operation, and transmits an authentication result to the mobile terminal. In a preferred embodiment, the authentication server compares terminal usage information stored therein with the terminal usage information received from the mobile terminal. If the terminal usage information received from the mobile terminal is different from the terminal usage information stored in the authentication server, the authentication server generates and transmits a lock order message including the terminal usage information stored in the authentication server to the mobile terminal. Generally, when receiving the lock order message including the terminal usage information stored in the authentication server from the authentication server, the legitimate mobile terminal ignores the lock order message since the terminal usage information stored in the memory unit of the legitimate mobile terminal is identical to the terminal usage information stored in the authentication server.

Next, the mobile terminal receives the authentication result from the wireless network (step S804). In this case, the authentication result received from the wireless network may be a lock order message caused by a cloned terminal having requested a call connection earlier than the legitimate mobile terminal. The mobile terminal checks the received authentication result (step S805). In case of authentication failure, the mobile terminal compares terminal usage information acting as grounds for authentication failure received from the wireless network with corresponding terminal usage information stored in the memory unit (step S806). If both are determined to be identical as a result of the comparison, the mobile terminal re-transmits the generated authentication information and the terminal usage information stored in the memory to the wireless network. If not identical, the mobile terminal sets an authentication flag to a second value indicating authentication failure (step S807). At this time, the authentication server in the wireless network receives terminal authentication information, terminal usage information, and RAND data from the MSC, and performs again the authentication process using the received information. Accordingly, the legitimate mobile terminal can receive an authentication success message from the wireless network.

In the meantime, in case of authentication success, the mobile terminal sets an authentication flag to a first value indicating authentication success (step S808). Accordingly, the mobile terminal updates the terminal usage information, and performs operations for a call connection with the wireless network.

Figure 7:
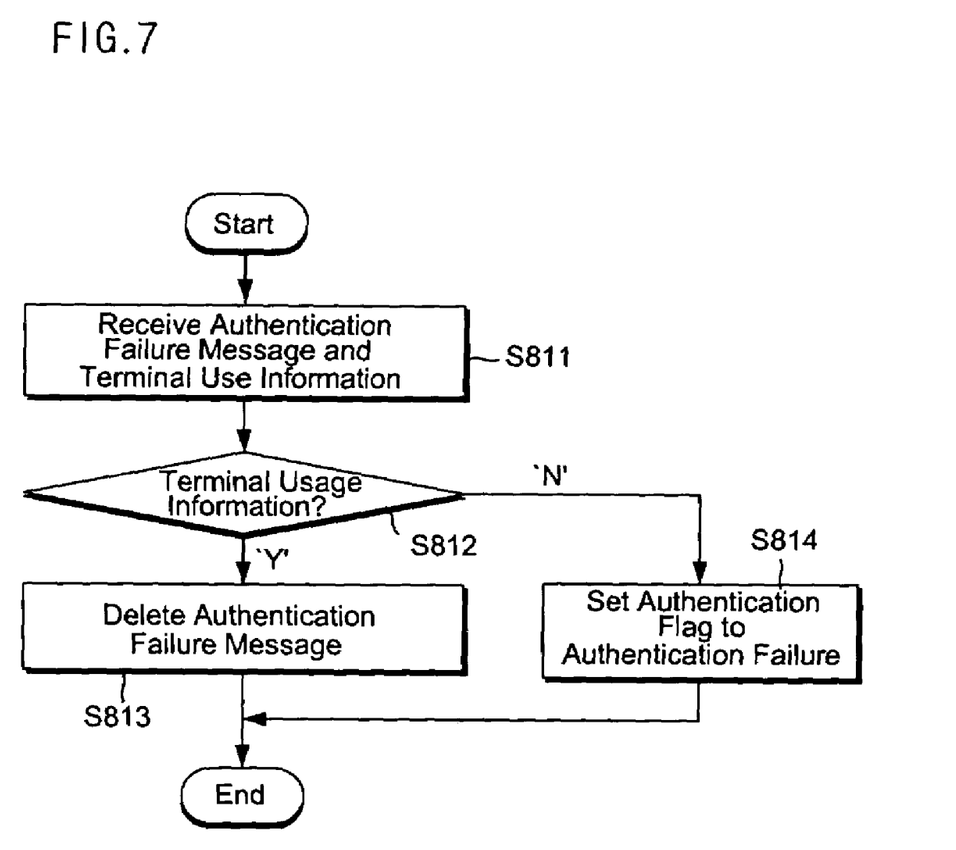
FIG. 7 is a flow chart showing a method of processing a lock order message of a mobile communication terminal in accordance with another preferred embodiment of the present invention.

FIG. 7 is a flow chart showing a method of processing a lock order message of a mobile terminal in accordance with another preferred embodiment of the present invention. That is, the present embodiment shows a procedure of processing a lock order message received from the wireless network due to the fraudulent usage of a cloned mobile terminal having requested a call connection while a legitimate mobile terminal is in an idle state.

Upon receiving a lock order message and terminal usage information acting as grounds for authentication failure from the wireless network (step S811), the mobile terminal compares the received terminal usage information with corresponding terminal usage information stored in the memory unit (step S812). In an embodiment, the terminal usage information may indicate call history count information, terminal usage time information, and packet data usage amount information.

If the received terminal usage information is determined to be identical to the corresponding terminal usage information stored in the mobile terminal, the mobile terminal ignores the lock order message (step S813). If not identical, the mobile terminal sets the authentication flag to authentication failure (step S814). Accordingly, when receiving the lock order message is received from the wireless network due to the cloned terminal having requested a call connection, the legitimate mobile terminal in an idle state will not process the authentication flag as authentication failure.

Figure 8:
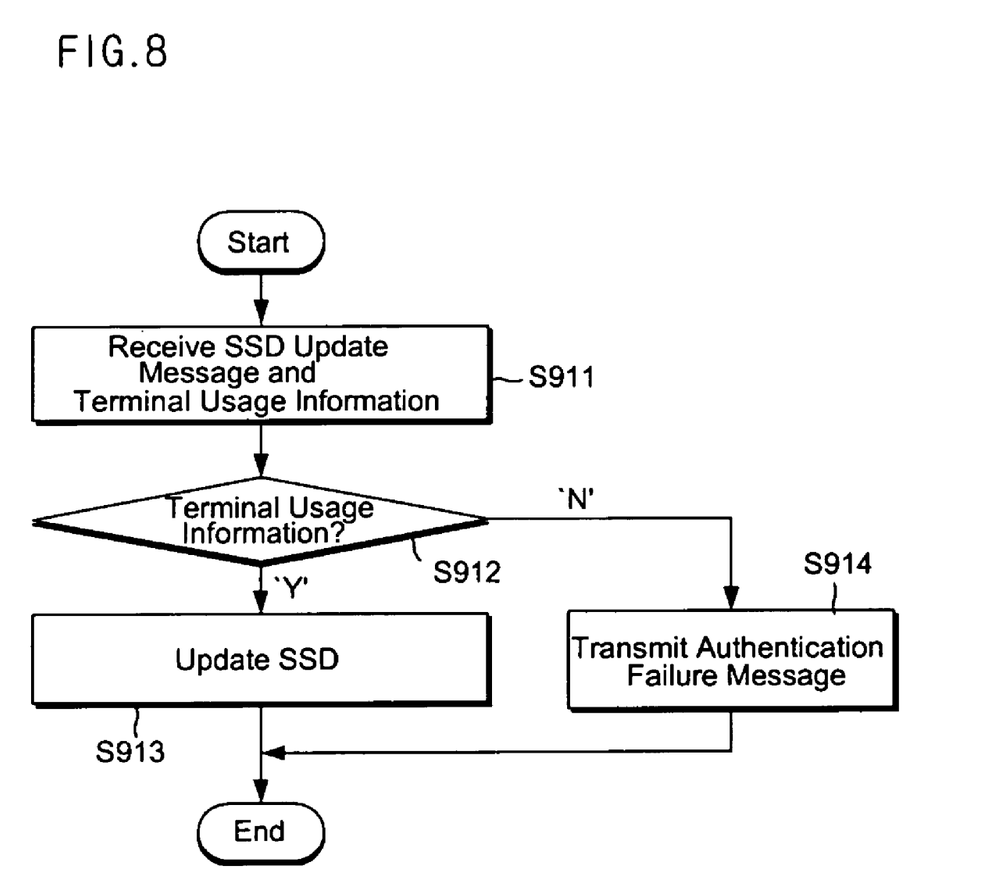
FIG. 8 is a flow chart showing an SSD update process used in a mobile communication terminal in accordance with a preferred embodiment of the present invention.

FIG. 8 is a flow chart showing an SSD update process used in a mobile terminal in accordance with a preferred embodiment of the present invention.

Upon receiving an SSD update message and terminal usage information from the wireless network (step S911), the mobile terminal compares the received terminal usage information with corresponding terminal usage information stored in the mobile terminal (step S912). In an embodiment, the terminal usage information may indicate call history count information and terminal usage time information.

If the received terminal usage information is identical to the corresponding terminal usage information stored in the mobile terminal (step S912), the mobile terminal performs a typical SSD update process (step S913).

If not identical, an SSD update failure message is transmitted to the wireless network (step S914).

As apparent from the above description, the present invention uses data usage amount information as an authentication value, thereby blocking a cloned terminal from accessing to a wireless data service.

In addition, the present invention uses terminal usage time information as an authentication value, thereby blocking a cloned terminal from establishing a voice call connection.

In addition, if a lock order message is received from a wireless network and an authentication flag is set to authentication failure, the mobile terminal blocks call connection attempt despite receiving a call connection request signal from a user, whereby the wireless network needs not to perform an unnecessary terminal authentication procedure.

In addition, upon receiving a lock order message from the wireless network, a legitimate mobile terminal is configured to ignore the received lock order message whereas a call connection to a cloned mobile terminal is configured to be blocked according to the lock order message. Accordingly, the legitimate mobile terminal can maintain a stable call connection to the wireless network although the lock order message is received from the wireless network due to the cloned mobile terminal.

Further, upon receiving an SSD update message from the wireless network, the legitimate mobile terminal is configured to perform an SSD update process whereas a cloned mobile terminal is configured to be prevented from performing the SSD update process, thereby preventing a fraudulent user from duplicating the legitimate mobile terminal.

While the present invention has been described with reference to exemplary embodiments thereof, it will be understood by those skilled in the art that various changes in form and details may be made therein without departing from the scope of the present invention as defined by the following claims.

What is claimed is:

1. A mobile communication terminal, comprising:
a key input unit for allowing a user to input an operation command;
a memory unit for storing authentication information including an authentication algorithm, an authentication key, a terminal ESN (electronic serial number), a subscriber MIN (mobile identification number), an SSD (shared secret data), and terminal usage time information;
a RF (radio frequency) communication unit for transmitting/receiving voice and data signals to/from the wireless network via an antenna; and
a control unit including an authentication processor to generate a voice call initiation message including an authentication information containing the terminal usage time information upon receiving a voice call connection request message from the key input unit, to transmit the voice call initiation message, and to perform a voice call release process upon receiving an authentication failure message from a wireless network in response to the voice call initiation message.

2. The mobile communication terminal of claim 1, wherein the terminal usage time information is monthly outgoing-call origination usage time information.

3. The mobile communication terminal of claim 1, wherein the terminal usage time information is monthly outgoing-call origination usage time information.

4. A system for automatically blocking a voice call connection, comprising:
a wireless network for receiving a voice call initiation message including the authentication information containing the terminal usage time information from a mobile communication terminal, generating and transmitting a voice call connection request message including authentication information containing terminal usage time information to an MSC (mobile switching center); and
an MSC for receiving the voice call connection request message including the authentication information containing the terminal usage time information from the wireless network, comparing the received terminal usage time information with previously stored terminal usage time information of a corresponding mobile communication terminal, and transmitting an authentication success message or an authentication failure message to the mobile communication terminal over the wireless network.

5. The system of claim 4, wherein the terminal usage time information is monthly outgoing-call origination usage time information.

6. A mobile communication terminal for transmitting authentication information comprised of a subscriber MIN (mobile identification number), a terminal ESN (electronic serial number), and data usage amount information to a wireless data service authentication server over a wireless network according to a wireless data service connection procedure, comprising:
a key input unit for allowing a user to input an operation command;
a memory unit for storing the subscriber MIN, the terminal ESN, and the data usage amount;
a RF communication unit for transmitting/receiving voice and data signals to/from the wireless network;
a control unit including an authentication processor for transmitting the subscriber MIN, the terminal ESN, and the data usage amount information stored in the memory unit to the wireless data service authentication server via the RF communication unit upon receiving a wireless data service connection request command from the key input unit, and performing a wireless data connection release process upon receiving an authentication failure message from the wireless data service authentication server in response to the transmitted information.

7. The mobile communication terminal of claim 6, wherein the data usage amount information is total data usage amount information or originating data usage amount information.

8. The mobile communication terminal of claim 6, wherein the data usage amount information is total data usage amount information or originating data usage amount information.

* * * * *